Aug. 24, 1965    F. C. RUSHING    3,202,465
THRUST BEARINGS
Filed March 3, 1945
Fig. 1.
Fig. 2.
Fig. 3.
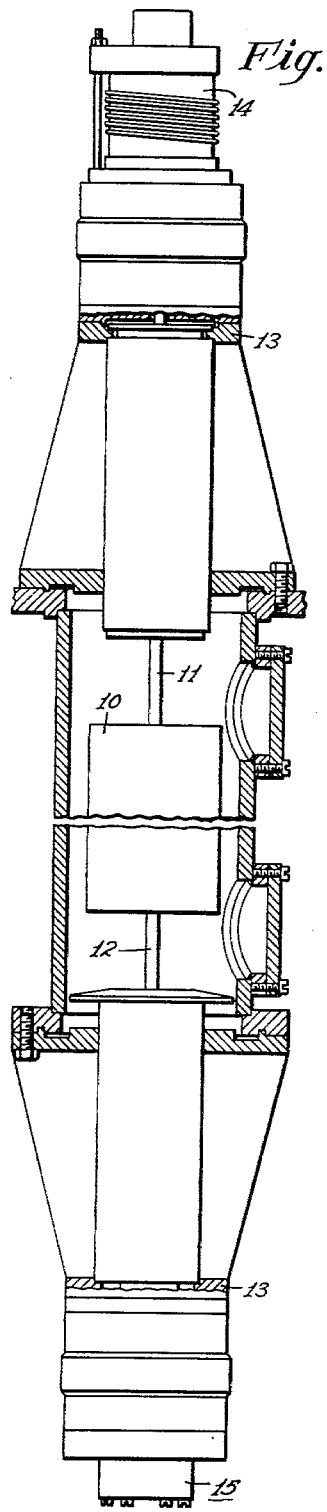
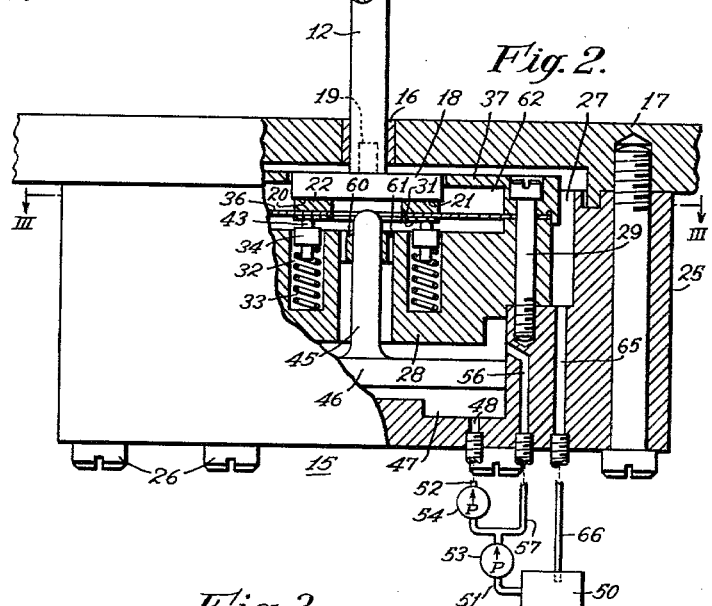
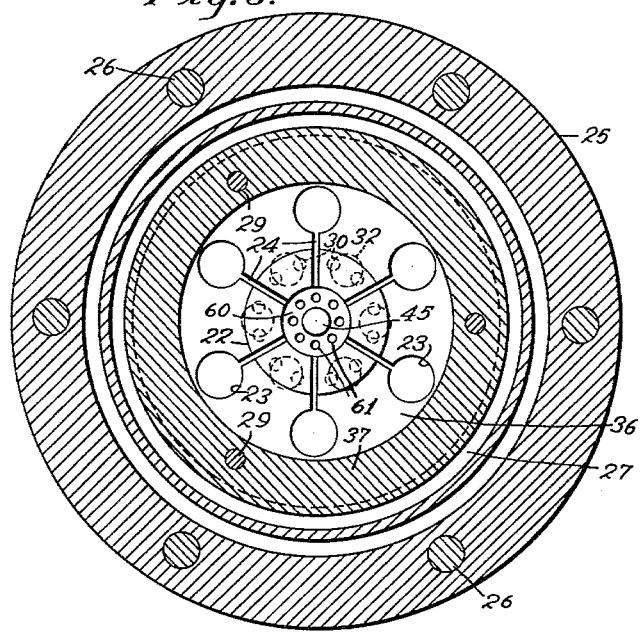
INVENTOR
Frank C. Rushing.
BY
ATTORNEY

United States Patent Office 3,202,465
Patented Aug. 24, 1965

3,202,465
THRUST BEARINGS
Frank C. Rushing, Pittsburgh, Pa., assignor, by mesne assignments, to the United States of America as represented by the United States Atomic Energy Commission
Filed Mar. 3, 1945, Ser. No. 580,786
4 Claims. (Cl. 308—160)

The present invention relates to bearings and more particularly to thrust bearings.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

In the construction of a thrust bearing it is desirable to provide cooperating bearing surfaces which are not subject to excessive friction and deterioration when the shaft with which the bearing is used rotates out of axial alignment, or when there may be small, and perhaps unavoidable, inaccuracies in construction of the bearing, and it is further desirable to provide for the positive lubrication of the thrust bearing in order further to guarantee long and efficient life to the bearing. It is also desirable in such a bearing to have minimum cooperating thrust bearing surfaces for slower speeds of rotation of the shaft replaceable with larger cooperating bearing surfaces for faster speeds of rotation so that adequate bearing surfaces may be provided for normal operating speeds without requiring excessive power in starting rotation of the shaft from a standstill and without encountering bearing-seizure at slow speeds of rotation. Such alternate cooperating bearing surfaces are likewise desirable because the lubrication film on the bearing surface is frequently not sufficiently built up upon starting rotation to afford protection to the surfaces and the smaller cooperating surfaces may be utilized until an adequate film is present for the larger cooperating surfaces, resulting in smaller necessary starting torque for rotation and saving the larger cooperating surfaces from damage due to lack of lubrication. These problems in thrust bearing design are of particular importance in high speed centrifugal separators having vertically disposed rotors where the high speed rotation of heavy rotors and shafts is attended by considerable bearing friction and vibration, and where minimum power means are desired for the desired high speed of rotation.

It is accordingly an object of the present invention to provide an improved bearing for taking the forces of axial thrust exerted by a rotating shaft, and the invention will be found particularly useful in the case of vertically positioned rotating shafts although not limited thereto.

Another object of the invention is the provision of a thrust bearing the structure of which includes a plurality of tiltably and resiliently mounted shoes furnishing thrust surfaces, and which further includes improved means for the positioning of such shoes.

Another object of the invention is to provide a thrust bearing having a plurality of shoes furnishing thrust surfaces wherein each shoe is individually spring mounted upon springs having sufficiently low spring constants to minimize the effect of inaccuracies in construction of the bearing elements and to insure equal distribution of load upon the several shoes.

The present invention further provides a thrust bearing having improved lubrication means whereby the bearing may be positively and efficiently lubricated and in such manner as to prevent foaming of the lubricant.

Still another object of the invention is the provision of a thrust bearing having lubricating means which are adapted to effect a lessening of the thrust load on the bearing surfaces as well as to positively and efficiently lubricate the bearing.

A further object is the provision of a thrust bearing affording broad cooperating bearing surfaces for operating speeds of a rotating shaft and substantially smaller cooperating bearing surfaces for use during starting of the shaft, and stopping of the shaft also, if desired, whereby power requirements for rotating the shaft are minimized, damage to the bearing avoided, and bearing-seizure may be prevented.

These and other objects of the invention and the feature and details of the construction and operation of one embodiment thereof are hereinafter fully set forth and described with reference to the accompanying drawings, in which:

FIG. 1 is a view partly in side elevation and partly in cross-section of a vertically arranged high speed centrifuge having a thrust bearing which is a typical and illustrative embodiment of the present invention;

FIG. 2 is a view partly in elevation and partly in vertical cross-section of the thrust bearing shown in FIG. 1; and FIG. 3 is a horizontal cross-sectional view taken along line 3—3 of FIG. 2.

In accordance with an illustrative embodiment of the present invention, there is provided a relatively broad-faced circular member on the end of a rotatable shaft to afford a thrust bearing surface for the shaft, and the broad surface of the member is adapted to seat against a plurality of bearing shoes which are resiliently mounted on a stationary bearing block so as to be capable of axial and tilting movement with respect to the rotatable shaft. The bearing shoes are held in position against the torque exerted by the rotating shaft and broad-faced bearing member by flat relatively stiff spring members one of which secures each bearing shoe to the stationary bearing block, the flat faces of the springs being so arranged as to be in planes perpendicular to the axis of the rotatable shaft.

Auxiliary thrust bearing means are provided for the rotatable shaft and as illustratively embodied comprise a shaft having a rounded end arranged to contact the center of the broad surfaced bearing member, hydraulic means being provided for auxiliary moving and positioning the shaft whereby it may supplant the bearing shoes as a cooperating bearing member for the circular bearing member when desired.

The lubricating means for the thrust bearing comprise means for continuously circulating lubricating fluid under pressure about the main and auxiliary bearing surfaces, the arrangement being such that the fluid is introduced centrally of the bearing and collected at the periphery thereof.

It will be understood that the foregoing general description and the following detailed description are exemplary and explanatory only of the invention and are not restrictive thereof.

Referring now in detail to the accompanying drawings, a thrust bearing of the present invention is illustratively shown in conjunction with a centrifuge which may be used, for example, for the isotopic separation of gaseous material at speeds of rotation as high as 470 revolutions per second. Such a centrifuge, as shown in FIG. 1, may comprise a vertically arranged rotor or bowl 10 rotatably mounted by means of upper and lower shafts 11 and 12, respectively, in a substantial framework 13, and an electric motor 14 is provided at the top of the assembly for driving rotor 10 through upper shaft 11.

The thrust bearing of the present invention is indicated generally by the numeral 15 and is positioned at the bottom of the centrifuge assembly to take the forces of vertical thrust exerted by and upon the lower rotor shaft 12. As shown in detail in FIG. 2 of the drawings, shaft 12 is journalled in a bearing 16 in a lower portion 17 of the stationary framework of the centrifuge, and is provided at its end with a circular thrust bearing member 18 having a central axially extending screw portion 19 threaded into the end of the shaft. The lower bearing surface 20 of the thrust bearing member 18 is adapted to seat upon cooperating upper bearing surfaces 21 of a plurality of bearing shoes 22, and these shoes are resiliently mounted so as to be capable of both limited axial movement and limited tilting movement with respect to member 18.

The thrust bearing assembly 15 is contained within a housing 25 which is firmly secured to framework portion 17 of the centrifuge by means of a plurality of tap bolts 26. Housing 25 has a relatively large central aperture or well 27 in which a bearing block 28 is positioned and held by means of tap bolts 29 extending into housing 25.

Bearing shoes 22 are resiliently mounted for limited axial movement by means of coiled springs 33 mounted in circular apertures 32 in the upper portion of block 28. Contact members having enlarged cylindrical portions 34 loosely fitted in apertures 32 are carried by springs 33 and reduced upper extensions 43 of the contact members support the bearing shoes 22 on rounded tips. The shoes are arranged to retain their positions against torque by means of a flat annular spring member 36 which is held at its outer periphery between bearing block 28 and an annular cap 37 for the bearing block secured thereto by tap bolts 29. As shown in FIG. 3, spring member 36 is formed with a plurality of circular apertures 23 and slots 24 extending radially therefrom to the inner periphery of the spring member. The member is thus formed with a plurality of flexible segments about its inner periphery, and the segmental bearing shoes 22 are secured to the top of these segments by means of rivets 30 which extend through the shoes, spring, and segmental backing members 31 on the opposite side of the spring member. In fabricating the shoe and spring assembly it will be found convenient to form the shoes 22 and backing members 31 as continuous annular bodies, position them correctly and rivet them to flat spring 36, and thereafter cut them into segments along slots 24. The segmental bearing shoes 22 are thus mounted for limited axial and tilting movement, and it is preferable that coiled springs 33 have low enough spring constants to minimize the effect of inaccuracies in construction of shoes 22 and bearing member 18, and to effect an equal distribution of load on the shoes.

The embodied auxiliary thrust bearing means which may be utilized to replace the cooperation of surfaces 20 and 21 to take the forces of axial thrust comprise a vertically extending shaft 45 having a rounded upper end to contact the thrust bearing member 18 at the center of its thrust surface 20. At its lower end, shaft 45 is provided with an integral piston 46 which closely fits into a cylindrical lower reduced portion 47 of the aperture or well 27 in housing 25, and a duct 48 through the bottom of housing 25 permits the entrance and exit of hydraulic fluid to and from cylinder 47. A source 50 of suitable fluid as, for instance, lubricating oil is provided and pipes 51 and 52 lead from the source to duct 48 and have pumps 53 and 54, respectively, therein to move oil into cylinder 47. Shaft 45 is thus provided with hydraulic actuating means to move it axially upwardly into contact with bearing surface 20 of thrust bearing member 18 and lift the member off of the cooperating thrust bearing shoes 22. A thrust bearing of very small frictional contact is thus afforded and may advantageously be used when the rotor 10 is being started in rotation from a standstill and, if desired, again when it is slowing down to a stop.

The embodied lubricating means for the thrust bearing of the present invention comprise the duct 56 through housing 25 leading to the upper portion of cylinder 47, and pipe 57 conducts lubricating oil from source 50 and pipe 51 to the cylinder, pump 53 serving to forward the oil. Lubricating oil thus introduced may circulate under pressure from cylinder 47 upwardly through block 28 and around shaft 45 to the thrust bearing surfaces, arriving centrally thereof so that centrifugal force is not exerted against the supply of lubricant to the bearing surfaces but is utilized to further the circulation of lubricant away from the surface. The bearing 60 between shaft 45 and bearing block 28 is provided with axial apertures 61 for the passage of oil therethrough. Oil from the thrust bearing flows outwardly into chamber 62 formed by cap 37 with bearing block 28, and thence out between bearing member 18 and cap 37, the latter being somewhat spaced apart from the former for this purpose. Lubricating oil which has thus flowed into the annular space between cap 37 and stationary portion 17 of the centrifuge framework is returned to source 50 through ducts 65 and pipe 66. It will be seen that lubricating oil, or other suitable fluid as may be desired, is circulated under pressure to the thrust bearing surfaces preventing foaming at the bearing and that the oil, arriving at the bearing centrally beneath thrust bearing member 18, is also effective to lighten somewhat the thrust load upon shoes 22 or shaft 45.

The invention in its broader aspects is not limited to the specific mechanism shown and described but departures may be made thereupon within the scope of the accompanying claims without departing from the principles of the invention and without sacrificing its chief advantages.

I claim:

1. Thrust bearing means for a rotatable shaft having a bearing surface comprising, in combination, a plurality of elements having bearing surfaces to cooperate with said shaft bearing surface, said elements being radially spaced from the center of said shaft bearing surface, and resiliently mounted upon flat spring segments arranged with their flat surfaces substantially perpendicular to the shaft axis, coiled springs biasing said segments and said elements towards said shaft bearing surface, a second shaft having a relatively small bearing surface engageable with the central portion of said shaft bearing surface, and means for relatively axially moving said elements and said second shaft whereby said second shaft is engaged and disengaged with said shaft bearing surface and said element surfaces and said second shaft surface may be interchanged as thrust surfaces cooperating with said shaft bearing surface as a thrust bearing.

2. Thrust bearing means for a rotatable shaft having a thrust bearing surface comprising, in combination, a plurality of elements having bearing surfaces to cooperate with said shaft bearing surface, said elements being radially spaced apart from the center of said shaft bearing surface, a second shaft having a relatively small surface for cooperation with the central portion of said shaft bearing surface, means for relatively axially moving said elements and said second shaft whereby said element surfaces and said second shaft surface may be interchanged as thrust surfaces cooperating with said shaft bearing surface as a thrust bearing, means for introducing lubricant under pressure about said second shaft to the central portion of said shaft bearing surface, and means radially outwardly of the center of said shaft bearing surface beyond said elements for carrying lubricant away from said cooperating bearing surfaces.

3. Thrust bearing means for a rotatable shaft having a thrust bearing surface comprising, in combination, a stationary member having a surface adjacent said shaft bearing surface, a plurality of recesses in said surface radially spaced apart from the center of said shaft bearing surface, an element in each recess having a rounded end, a coiled spring in each recess beneath the element therein resiliently supporting said element, a bearing segment between each element and the shaft surface contacting the rounded ends of the respective elements, and a flat spring having its flat surface substantially perpendicular to the axis of said shaft interconnecting each segment and said stationary member.

4. Thrust bearing means for a rotatable shaft having a thrust bearing surface comprising, in combination, a plurality of elements having bearing surfaces to cooperate with said shaft bearing surface, said elements being radially spaced apart from the center of said shaft bearing surface, a second shaft having a relatively small surface for cooperation with the central portion of said shaft bearing surface, means comprising a hydraulic cylinder and piston therein integral with said second shaft for axially moving said second shaft to engage and disengage its bearing surface with the shaft bearing surface whereby said element surfaces and said second shaft surface may be interchanged as thrust surfaces cooperating with said shaft bearing surface as a thrust bearing, means for introducing lubricant under pressure about said second shaft to the central portion of said shaft bearing surface, and means radially outwardly of the center of said shaft bearing surface beyond said elements for carrying lubricant away from said cooperating bearing surfaces.

References Cited by the Examiner

UNITED STATES PATENTS

| | | | |
|---|---|---|---|
| 1,117,499 | 11/14 | Kingsbury | 308—160 |
| 1,272,041 | 7/18 | Herr | 308—160 |
| 1,421,208 | 6/22 | Gauldie | 308—160 |
| 1,734,273 | 11/29 | Schein | 308—160 |
| 1,754,324 | 4/30 | Kingsbury | 308—160 |
| 2,169,296 | 8/39 | Smith | 308—160 |
| 2,274,764 | 3/42 | Yeomans | 308—160 |

DON A. WAITE, *Primary Examiner.*

H. D. HILL, *Examiner.*